United States Patent
Deguchi et al.

(10) Patent No.: US 9,641,118 B2
(45) Date of Patent: May 2, 2017

(54) VEHICULAR CONTROL APPARATUS

(71) Applicant: TOYOTA JIDOSHA KABUSHIKI KAISHA, Toyota-shi (JP)

(72) Inventors: Junichi Deguchi, Susono (JP); Kazuya Arakawa, Fujinomiya (JP); Kensuke Yoshizue, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/993,510

(22) Filed: Jan. 12, 2016

(65) Prior Publication Data

US 2016/0211788 A1    Jul. 21, 2016

(30) Foreign Application Priority Data

Jan. 15, 2015   (JP) ................. 2015-006077

(51) Int. Cl.
*H02P 25/08*   (2016.01)
*H02P 25/086*   (2016.01)
(Continued)

(52) U.S. Cl.
CPC .......... *H02P 25/086* (2013.01); *B60L 3/0061* (2013.01); *B60L 3/06* (2013.01); *B60L 11/123* (2013.01); *B60L 11/14* (2013.01); *B60L 15/2072* (2013.01); *B60L 15/2081* (2013.01); *H02P 25/0925* (2016.02); *B60L 2240/12* (2013.01); *B60L 2240/32* (2013.01); *B60L 2240/421* (2013.01); *B60L 2240/423* (2013.01); *B60L 2240/429* (2013.01); *B60L 2240/642* (2013.01); *B60L 2240/80* (2013.01);
(Continued)

(58) Field of Classification Search
CPC .................................................. H02P 25/086
See application file for complete search history.

(56) References Cited

U.S. PATENT DOCUMENTS

2005/0073279 A1   4/2005   Fenley
2006/0028024 A1   2/2006   Franke
(Continued)

FOREIGN PATENT DOCUMENTS

EP   1 391 980 A2   2/2004
EP   1 391 980 A3   2/2004
(Continued)

*Primary Examiner* — Kawing Chan
(74) *Attorney, Agent, or Firm* — Oblon, McClelland, Maier & Neustadt, L.L.P.

(57) ABSTRACT

A vehicular control apparatus that includes a switched reluctance motor and an electronic control unit is provided. The switched reluctance motor has a rotor and a stator and is mounted as a travel drive source in a vehicle. The electronic control unit executes current control of the switched reluctance motor. The electronic control unit executes first current control for causing the rotor to rotate in a reverse direction from a rotational direction in which the vehicle is started in the case where the vehicle is not started even when the switched reluctance motor outputs maximum torque within an allowable range, and executes control for causing the rotor to rotate in the rotational direction in which the vehicle is started after the rotor rotates in the reverse direction by the first current control to a rotation position at which torque for enabling a start of the vehicle can be output.

4 Claims, 9 Drawing Sheets

(51) Int. Cl.

| | | |
|---|---|---|
| *B60L 3/00* | (2006.01) | |
| *B60L 3/06* | (2006.01) | |
| *B60L 11/12* | (2006.01) | |
| *B60L 11/14* | (2006.01) | |
| *B60L 15/20* | (2006.01) | |
| *H02P 25/092* | (2016.01) | |

(52) U.S. Cl.
CPC ........ *B60L 2260/28* (2013.01); *Y02T 10/6217* (2013.01); *Y02T 10/645* (2013.01); *Y02T 10/7077* (2013.01); *Y02T 10/72* (2013.01); *Y02T 10/7275* (2013.01); *Y02T 10/7291* (2013.01); *Y02T 90/16* (2013.01)

(56) References Cited

U.S. PATENT DOCUMENTS

| | | |
|---|---|---|
| 2007/0296372 A1 | 12/2007 | Hori et al. |
| 2009/0025992 A1 | 1/2009 | Hayashi et al. |
| 2014/0024491 A1* | 1/2014 | Kobayashi ............ B60W 20/10 477/3 |

FOREIGN PATENT DOCUMENTS

| | | | |
|---|---|---|---|
| JP | 10-337073 A | | 12/1998 |
| JP | 2003-199205 A | | 7/2003 |
| JP | 2011213166 A | * | 10/2011 |
| JP | 2012-90462 | | 5/2012 |

* cited by examiner

VEHICULAR CONTROL APPARATUS

INCORPORATION BY REFERENCE

The disclosure of Japanese Patent Application No. 2015-006077 filed on Jan. 15, 2015 including the specification, drawings and abstract is incorporated herein by reference in its entirety.

BACKGROUND OF THE INVENTION

1. Field of the Invention

The invention relates to a vehicular control apparatus.

2. Description of Related Art

Conventionally, a vehicle in which a switched reluctance motor is mounted as a drive source has been known. As a technique for controlling the switched reluctance motor in such a vehicle, for example, Japanese Patent Application Publication No. 2012-90462 (JP 2012-90462 A) discloses a technique of a motor control apparatus that changes a specified angle (a speed reduction start point) in accordance with a supply voltage of the motor (the switched reluctance motor) or a winding temperature (flow resistance of a drive current of the motor) in the case where a rotational speed of the motor is reduced after a rotation angle of the motor comes to be within a specified range from a target rotation angle.

When control for stopping the switched reluctance motor at the target rotation angle is executed, the switched reluctance motor is not necessarily stopped at a target rotation angle. In addition, there is a possibility that a rotation angle of the switched reluctance motor during a start differs from the target rotation angle because a stop position of the switched reluctance motor is changed after a stop due to disturbance or the like. Maximum torque that can be output by the switched reluctance motor differs in accordance with the rotation angle. Accordingly, in the case where the rotation angle of the switched reluctance motor during the start of the vehicle is a rotation angle at which sufficient torque cannot be output, start performance is possibly degraded.

SUMMARY OF THE INVENTION

In view of the above problem, the invention provides a vehicular control apparatus that can improve start performance of a vehicle in which a switched reluctance motor is mounted.

Thus, according to one aspect of the invention, a vehicular control apparatus that includes a switched reluctance motor and an electronic control unit is provided. The switched reluctance motor has a rotor and a stator and is mounted as a travel drive source in a vehicle. The electronic control unit is configured to execute current control of the switched reluctance motor. The electronic control unit is configured to: (i) execute first current control, the first current control causing the rotor to rotate in a reverse direction from a rotational direction in which the vehicle is started in the case where the vehicle is not started even when the switched reluctance motor outputs maximum torque that can be output by the normal current control; and (ii) execute control for causing the rotor to rotate in the rotational direction in which the vehicle is started after the rotor rotates in the reverse direction by the first current control to a rotation position at which torque for enabling a start of the vehicle can be output.

According to the vehicular control apparatus as described above, start performance of the vehicle can be improved by causing a reverse rotation of the rotor to the rotation position at which the torque for enabling the start of the vehicle can be output by the first current control.

In addition, in the above vehicular control apparatus, the electronic control unit may be configured to prioritize execution of second current control over that of the first current control in the case where the vehicle is not started by the maximum torque that can be output by the normal current control. The second current control causes the switched reluctance motor to temporarily output torque that is in the rotational direction for starting the vehicle and is higher than the maximum torque that can be output by the normal current control.

According to the vehicular control apparatus as described above, because the execution of the second current control is prioritized over that of the first current control, the start performance of the vehicle can be improved by increasing start responsiveness.

In addition, in the above vehicular control apparatus, in the first current control, the electronic control unit may be configured to: (i) stop excitation of the switched reluctance motor, and (ii) cause the rotor to rotate in the reverse direction by a gravitational force that acts on the vehicle.

According to the vehicular control apparatus as described above, the rotor can rotate reversely while electric power consumption is suppressed. Thus, both of the improvement in the start performance of the vehicle and a reduction in fuel consumption can be achieved.

In addition, in the above vehicular control apparatus, in the first current control, the electronic control unit may be configured to: in the case where the rotor does not rotate in the reverse direction even after the excitation of the switched reluctance motor is stopped for a specified period, (i) cause the switched reluctance motor to output torque in the reverse direction, and (ii) cause the rotor to rotate in the reverse direction.

According to the vehicular control apparatus as described above, because the reverse rotation of the rotor is promoted by motor torque, the start performance of the vehicle can be improved by adjusting a rotation position of the rotor.

Furthermore, in the above vehicular control apparatus, in the first current control, the electronic control unit may be configured to: in the case where the vehicle is not started by the maximum torque that can be output by the normal current control and a start direction of the vehicle is an uphill direction, (i) cause the switched reluctance motor to output the torque in the reverse direction, and (ii) cause the rotor to rotate in the reverse direction.

According to the vehicular control apparatus as described above, because the reverse rotation of the rotor is promoted by the motor torque, the start responsiveness can be improved.

The vehicular control apparatus according to the invention executes the first current control for causing the rotor to rotate in the reverse direction from the rotational direction in which the vehicle is started in the case where the vehicle is not started even when the switched reluctance motor outputs the maximum torque that can be output by the normal current control, and executes control for causing the rotor to rotate in the rotational direction in which the vehicle is started after the rotor rotates in the reverse direction by the first current control to the rotation position at which the torque for enabling the start of the vehicle can be output. The vehicular control apparatus according to the invention exhibits such an effect that the start performance of the vehicle can be improved by changing the rotation position of the rotor and thereby adjusting the maximum torque that can be output by the switched reluctance motor.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a detailed description will be made on a vehicular control apparatus according to an embodiment of the invention with reference to the drawings. It should be noted that the invention is not limited by this embodiment. In addition, as components in the embodiment below, components that could easily be arrived by a person skilled in the art or substantially the same components are included.

Figure 1:
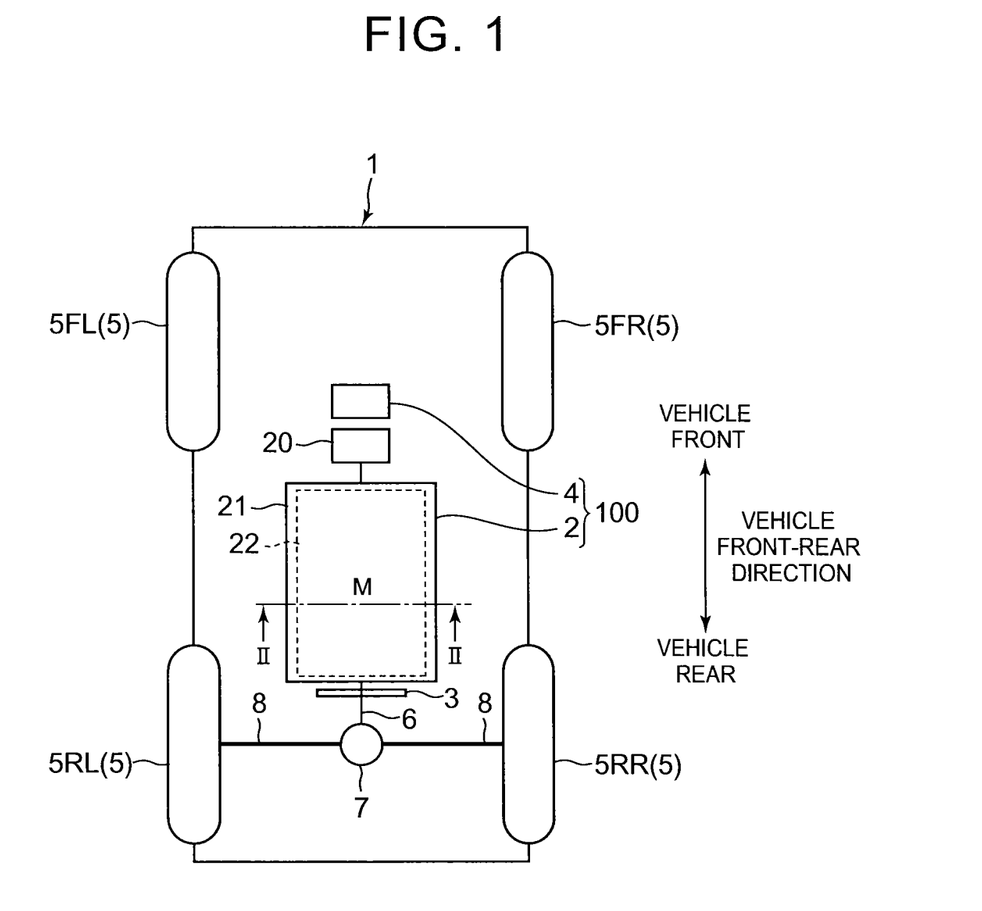
FIG. 1 is a schematic configuration diagram of a vehicle according to a first embodiment.
Figure 2:
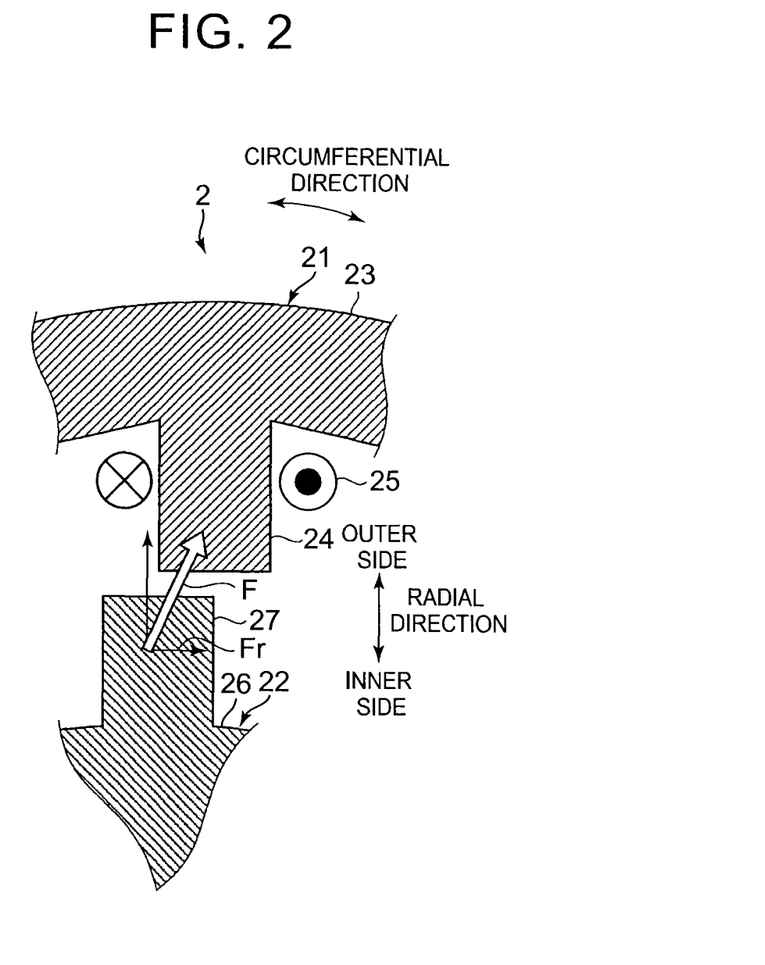
FIG. 2 is a cross-sectional view of a main section of a switched reluctance motor according to the first embodiment.
Figure 3:
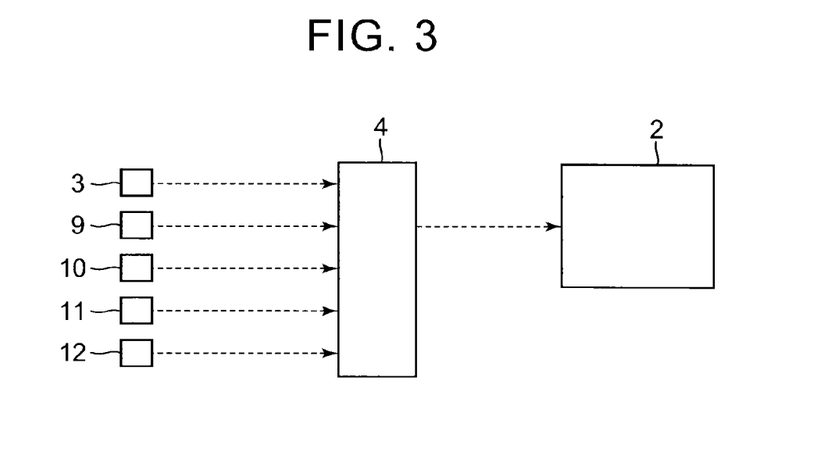
FIG. 3 is a block diagram of the vehicle according to the first embodiment.
Figure 4:
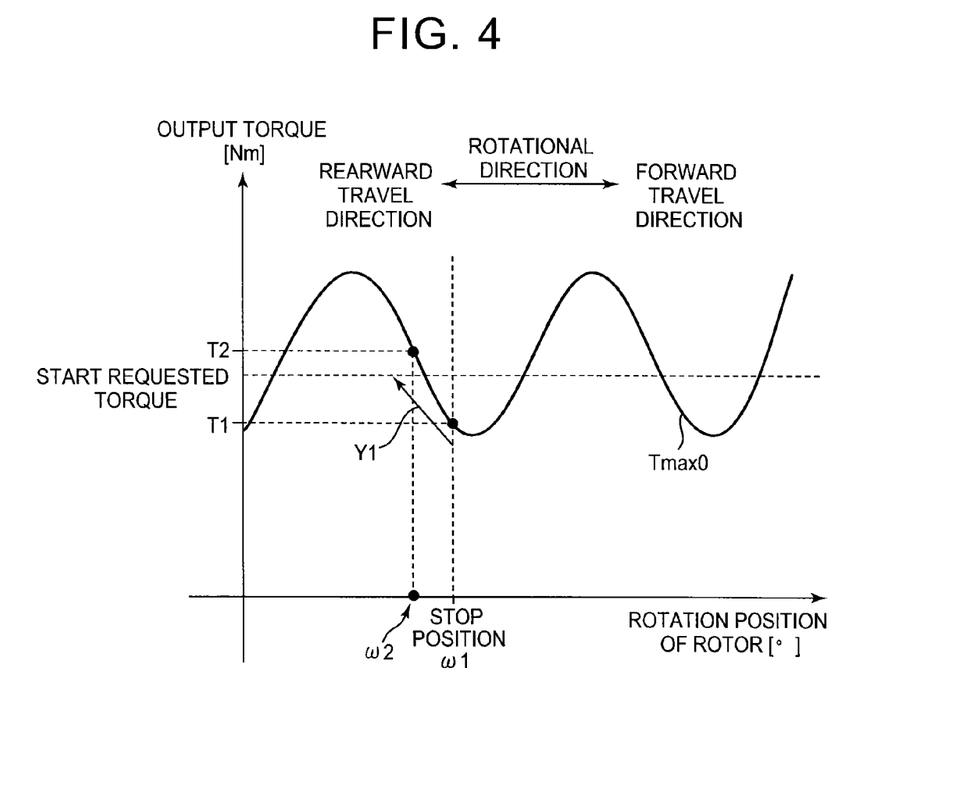
FIG. 4 is an explanatory map of first current control according to control of the first embodiment.
Figure 5:
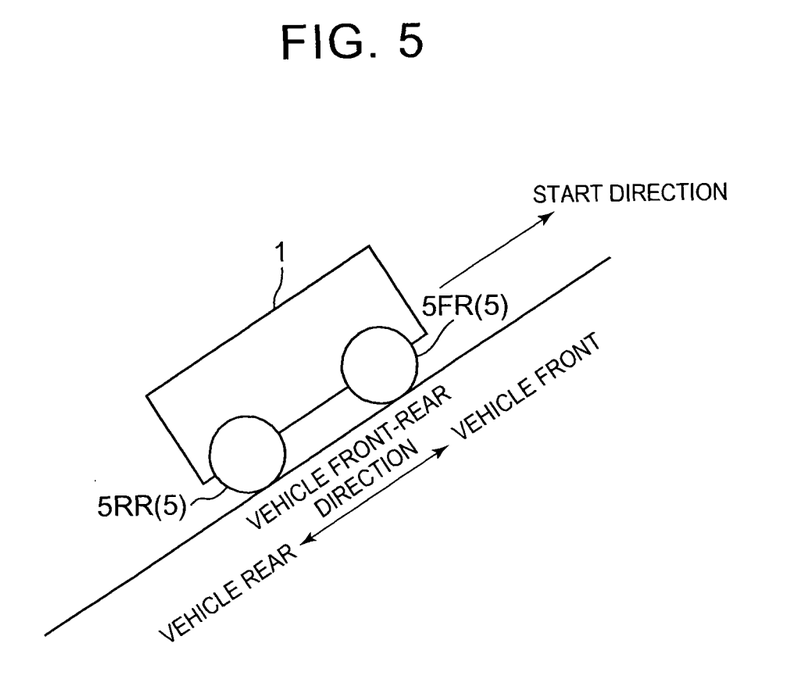
FIG. 5 is a view of a start in an uphill direction of the vehicle of the first embodiment.
Figure 6:
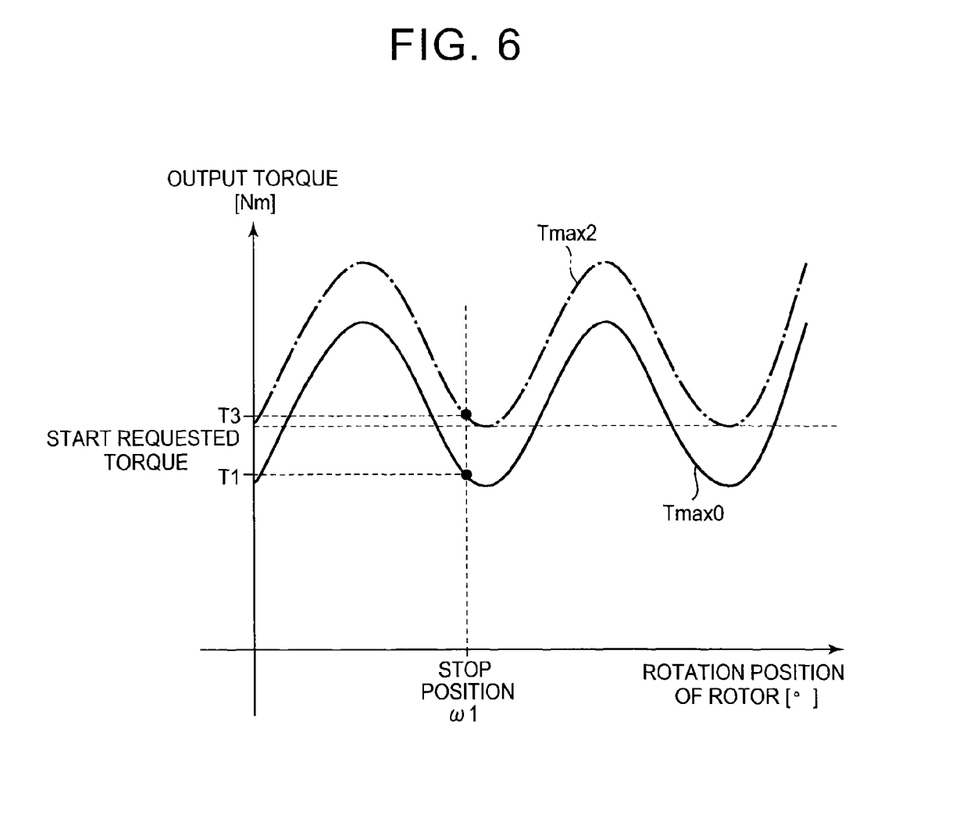
FIG. 6 is an explanatory map of second current control according to the control of the first embodiment.
Figure 7:
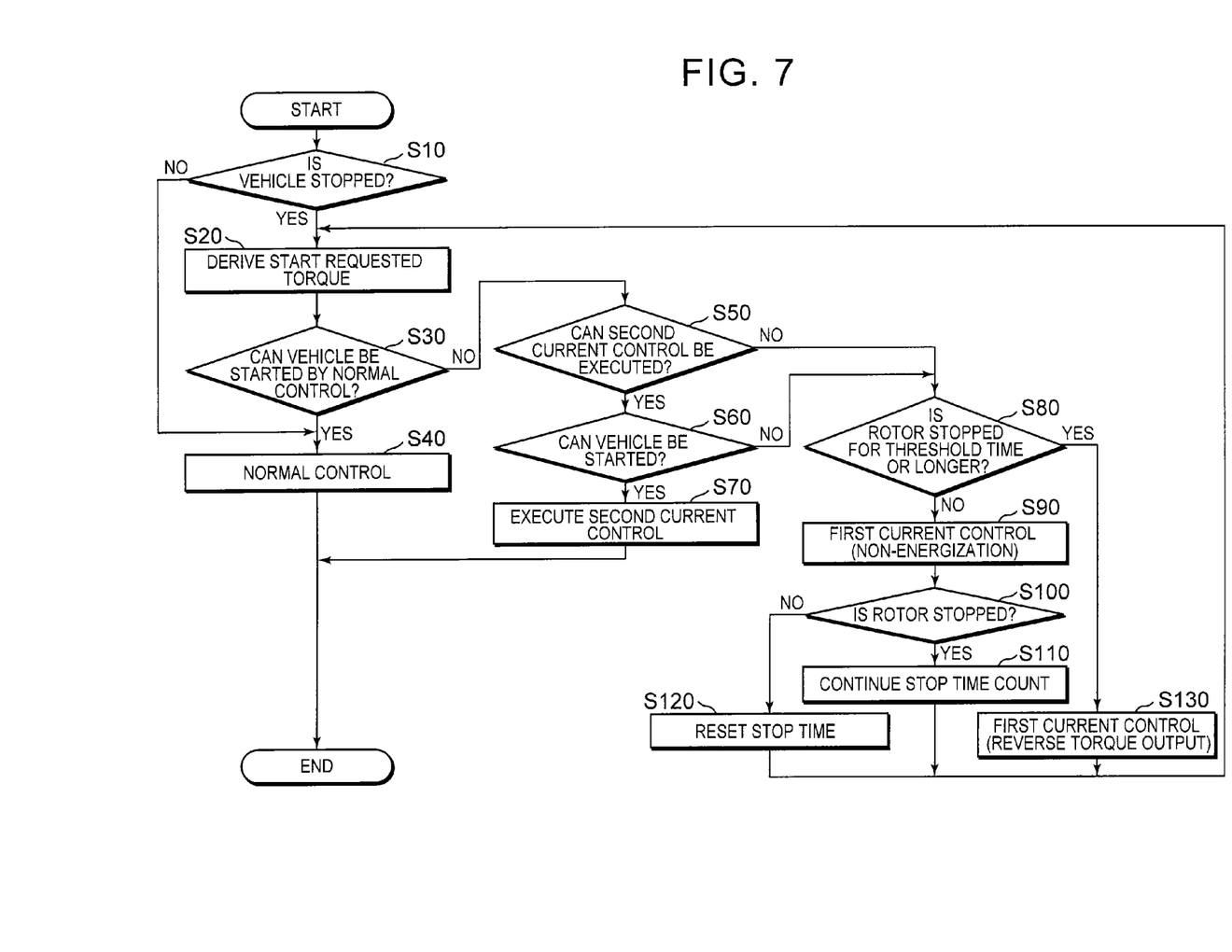
FIG. 7 is a flowchart of an operation according to the first embodiment.

A first embodiment will be described with reference to FIG. 1 to FIG. 7. This embodiment relates to a vehicular control apparatus. FIG. 1 is a schematic configuration diagram of a vehicle according to the first embodiment of the invention, FIG. 2 is a cross-sectional view of a main section of a switched reluctance motor according to the first embodiment, FIG. 3 is a block diagram of the vehicle according to the first embodiment, FIG. 4 is an explanatory map of first current control, FIG. 5 is a view of a start in an uphill direction, FIG. 6 is an explanatory map of second current control, and FIG. 7 is a flowchart of an operation according to the first embodiment.

As shown in FIG. 1, a vehicle 1 includes a vehicular control apparatus 100, vehicle wheels 5, and a battery 20. The vehicle 1 has the four vehicle wheels 5 (a front left wheel 5FL, a front right wheel 5FR, a rear left wheel 5RL, and a rear right wheel 5RR). The left and right rear wheels 5RL, 5RR are drive wheels. The left and right front wheels 5FL, 5FR are driven wheels. The vehicular control apparatus 100 of this embodiment includes a switched reluctance motor (an SR motor) 2 and an electronic control unit (ECU) 4 (hereinafter referred to as an ECU 4). The vehicular control apparatus 100 may further include a position detecting section 3.

The SR motor 2 is mounted as a travel drive source in the vehicle 1. The SR motor 2 is connected to the battery 20. The SR motor 2 has a function as an electric motor that converts electric power supplied from the battery 20 into torque and a function as a generator that converts the transmitted torque to the electric power and stores the electric power in the battery 20. As shown in FIG. 2, the SR motor 2 includes a stator 21 and a rotor 22. The stator 21 is unrotatably fixed to a vehicle body. The stator 21 has a cylindrical stator main body 23. Plural salient poles 24, each of which is constructed of a magnetic body, are provided on an inner circumferential surface of the stator main body 23. The salient pole 24 is projected from the stator main body 23 toward a radially inner side of the stator main body 23. The salient poles 24 are arranged at specified intervals along a circumferential direction, for example, at equally-spaced intervals. A coil 25 is wound around each of the salient poles 24.

The rotor 22 has a cylindrical rotor main body 26. Plural salient poles 27, each of which is constructed of the magnetic body, are provided on an outer circumferential surface of the rotor main body 26. The salient pole 27 is projected from the rotor main body 26 toward a radially outer side of the rotor main body 26. The salient poles 27 are arranged at specified intervals along the circumferential direction, for example, at equally-spaced intervals. The rotor 22 is arranged inside the stator 21 in a manner that a center axis of the stator 21 matches a center axis of the rotor 22. The rotor 22 is supported by a bearing in a manner capable of freely rotating relative to the stator 21.

When a current flows through the coil 25 of a certain salient pole 24 in the stator 21, a suction force F is generated between the salient pole 24 and the salient pole 27 of the rotor 22 due to a magnetic flux that is generated between the salient pole 24 and the salient pole 27 by the current. A component Fr in the circumferential direction of the suction force F becomes a rotation force for rotating the rotor 22. The SR motor 2 has a control circuit for controlling energization timing and an energization amount with respect to the each coil 25. The control circuit executes energization control of the each coil 25 in response to a command from the ECU 4. The coil 25 that is energized is appropriately switched in accordance with a rotation position of the rotor 22, and the rotor 22 is thereby rotationally driven. In addition, the energization amount of the each coil 25 is adjusted in accordance with a command value of output torque of the SR motor 2.

Returning to FIG. 1, a rotational shaft 6 of the rotor 22 is connected to a differential gear set 7. The differential gear set 7 is respectively connected to the rear wheels 5RL, 5RR via left and right drive shafts 8. The rotor 22 is mechanically coupled to the rear wheels 5RL, 5RR via the differential gear set 7 and the drive shafts 8 and rotates in an interlocking manner with the rear wheels 5RL, 5RR. Rotation of the rotor 22 is at least decelerated in the differential gear set 7 and is transmitted to the rear wheels 5RL, 5RR. The position detecting section 3 detects the rotation position of the rotor 22. The position detecting section 3 of this embodiment is a resolver and can detect the rotation position of the rotor 22 at high precision.

As shown in FIG. 3, the ECU 4 is connected to the position detecting section 3, a vehicle speed sensor 9, a gradient sensor 10, an accelerator operation amount sensor 11, and a shift position sensor 12. The vehicle speed sensor 9 detects a travel speed of the vehicle 1. The gradient sensor 10 detects a road surface gradient in a vehicle front-rear direction. The gradient sensor 10 is, for example, an acceleration sensor that detects an inclination angle of a vehicle front-rear shaft with respect to a horizontal direction. The accelerator operation amount sensor 11 detects a depression amount of an accelerator pedal by a driver. The shift position sensor 12 detects a shift operation by the driver with respect to an operation input member such as a shift lever. The shift position sensor 12 determines a shift range requested by the driver by detecting a shift position of the shift lever, for example. A forward travel range including a D range, a rear travel (R) range, a neutral range, a parking range, and the like are included in the shift ranges, for example. Signals indicative of detection results of the position detecting section 3, the vehicle speed sensor 9, the gradient sensor 10, the accelerator operation amount sensor 11, and the shift position sensor 12 are output to the ECU 4.

The ECU 4 is a control section for controlling the vehicle 1 and, for example, an electronic control unit. The ECU 4 calculates an acceleration requested amount by the driver with respect to the vehicle 1 on the basis of an acceleration operation by the driver. The ECU 4 of this embodiment calculates a requested acceleration as one of the acceleration requested amounts. The requested acceleration is calculated from an accelerator operation amount and a vehicle speed, for example. The ECU 4 calculates requested torque with respect to the SR motor 2 from the requested acceleration. It should be noted that a value of the torque in this embodiment is a value that is converted into torque on the drive shafts 8. The vehicle 1 of this embodiment has the SR motor 2 as only one travel drive source. Accordingly, the requested torque with respect to the SR motor 2 is determined such that an acceleration of the vehicle 1 matches the requested acceleration by the output torque of the SR motor 2. In the following description, the requested torque with respect to the SR motor 2 that corresponds to the requested acceleration by the driver is also referred to as "requested motor torque".

The ECU 4 executes current control of the SR motor 2 on the basis of the requested motor torque. The ECU 4 of this embodiment determines the energization amount of the each coil 25 on the basis of the requested motor torque and the rotation position of the rotor 22 that is detected by the position detecting section 3, and commands the determined energization amount to the SR motor 2. The control circuit of the SR motor 2 controls the energization amount of the each coil 25 in accordance with a command value of the energization amount. The control circuit controls a current value supplied from the battery 20 to the each coil 25 by pulse width modulation (PWM) control, for example.

In this embodiment, rotational directions of the rotor 22 of the SR motor 2 are referred as follows. A forward travel rotational direction: a direction of motor torque that drives the vehicle 1 toward front of the vehicle. A rearward travel rotational direction: a direction of the motor torque that drives the vehicle 1 toward rear of the vehicle. That is, the rotational direction of the rotor 22 at a time that the vehicle 1 travels forward (travels in a direction toward the front of the vehicle) is the forward travel rotational direction. On the other hand, the rotational direction of the rotor 22 at a time that the vehicle 1 travels rearward (travels in a direction toward the rear of the vehicle) is the rearward travel rotational direction.

In addition, regardless of a travel direction of the vehicle 1, a direction of the torque that generates drive power in the travel direction of the vehicle 1 requested by the driver is referred to as a "positive direction", and an opposite direction from the positive direction is referred to as a "reverse direction". For example, when a forward travel is requested by the driver, a direction of the torque that generates the drive power in a forward travel direction to the vehicle 1 becomes the positive direction, and a direction of the torque that generates the drive power in a rearward travel direction to the vehicle 1 becomes the reverse direction. Meanwhile, when a rearward travel is requested by the driver, a direction of the torque that generates the drive power in the rearward travel direction to the vehicle 1 becomes the positive direction, and an opposite direction from this becomes the reverse direction. Accordingly, when a start in the forward travel direction is requested by the driver in a stop state, the direction of the torque that generates the forward travel drive power is a positive rotational direction of the rotor 22.

As shown in FIG. 2, in the SR motor 2, the component Fr in the circumferential direction of the suction force F between the salient pole 24 of the stator 21 and the salient pole 27 of the rotor 22 becomes the rotation force of the rotor 22. Accordingly, a magnitude of the rotation force is changed in accordance with a relative position in the circumferential direction between the salient pole 24 and the salient pole 27. In other words, even when the energization amount of the coil 25 is the same, a magnitude of the generated torque is changed in accordance with the rotation position of the rotor 22.

FIG. 4 shows a relationship between normal maximum torque Tmax0 of the SR motor 2 and the rotation position of the rotor 22. In FIG. 4, a horizontal axis indicates the rotation position [°] of the rotor 22, and a vertical axis indicates the output torque [Nm] of the SR motor 2. As shown in FIG. 4, a magnitude of the normal maximum torque Tmax0 is periodically changed in accordance with the rotation position. The normal maximum torque Tmax0 is maximum torque within an allowable range in normal control of the SR motor 2. The normal control is the current control with respect to the SR motor 2 and is control other than the first current control and the second current control, which will be described below. The normal control is the current control executed on the basis of a maximum current value that is normally used during a travel, and is control that is executed within an optimum current range, for which durability of the SR motor 2 and that of the battery 20 are taken into consideration, for example. In the normal control, an allowable maximum current value that is supplied to the SR motor 2 is determined in advance. In the following description, the allowable maximum current value in the normal control is referred to as a "normal maximum current value Imax0". The normal maximum torque Tmax0 is the torque output by the SR motor 2 when the normal maximum current value Imax0 is supplied to the SR motor 2.

There is a case where the torque required to start the vehicle 1 becomes a high value, such as a case where a vehicle is started in the uphill direction on a slope road as shown in FIG. 5. As described above, the magnitude of the normal maximum torque Tmax0 differs in accordance with the rotation position of the rotor 22. Thus, depending on the rotation position of the rotor 22 at a stop, there is a possibility that the magnitude of the normal maximum torque Tmax0 becomes smaller than a magnitude of the torque required for the start (hereinafter, simply referred to as "start requested torque"). For example, in the case where the rotor 22 is stopped at a rotation position ω1 (hereinafter referred to as a "stop position ω1") shown in FIG. 4, a magnitude of the maximum torque that the SR motor 2 is allowed to output in the normal control is T1 and is smaller than the magnitude of the start requested torque shown in FIG. 4.

The vehicular control apparatus 100 of this embodiment increases the torque that can be output by the SR motor 2 by the first current control and the second current control, which will be described below, and thereby improves start performance of the vehicle 1.

The first current control will be described with reference to FIG. 4. The first current control is control for causing temporal reverse rotation of the rotor 22 when the start of the vehicle 1 in the uphill direction is requested. In other words, the first current control is current control for causing the rotor 22 to rotate in the opposite direction (a reverse rotational direction) from a rotational direction to start the vehicle 1. The first current control of this embodiment includes reverse torque output control for causing reverse rotation of the SR motor 2 by causing the SR motor 2 to generate the torque in the reverse rotational direction and non-energization control for causing the reverse rotation of the SR motor 2 by a gravitational force that acts on the vehicle 1 as a state where the SR motor 2 is not energized and thus the SR motor 2 does not generate the torque. When the vehicle 1 travels forward, the rotation position of the rotor 22 is changed in the forward travel rotational direction (a right direction in FIG. 4) in response to the forward travel of the vehicle 1. In the case where the vehicle 1 is started in the forward travel direction and the magnitude of the normal maximum torque Tmax0 T1 at the stop position ω1 is smaller than the magnitude of the start requested torque, the ECU 4 causes the rotor 22 to rotate in the rearward travel rotational direction by the first current control as indicated by an arrow Y1. The magnitude of the normal maximum torque Tmax0 is changed by a change in the rotation position of the rotor 22. When the magnitude of the normal maximum torque Tmax0 that corresponds to the rotation position of the rotor 22 becomes the start requested torque or larger, the ECU 4 terminates the first current control at the rotation position and executes control for causing the SR motor 2 to generate the torque in the forward travel rotational direction.

For example, it is assumed that the rotation position of the rotor 22 becomes a position ω2 by the first current control. At the position ω2, a maximum value within the allowable range of the output torque of the SR motor 2 is a value T2 that is larger than the start requested torque. In this way, the SR motor 2 can start the vehicle 1 by outputting the torque that is higher than travel resistance torque such as a gradient. When the vehicle 1 is started and starts traveling, a frictional resistance value in each section of a drive system of the vehicle 1 is changed from a resistance value by static friction before the start to a resistance value by dynamic friction. That is, a magnitude of the frictional resistance value after the start (a dynamic frictional resistance value) is smaller than a magnitude of the frictional resistance value during the stop (a static frictional resistance value). Accordingly, there is a high possibility that the magnitude of the normal maximum torque Tmax0 of the SR motor 2 at the each rotation position becomes larger than the travel resistance torque after the start and thus the vehicle 1 can continuously travel forward by the SR motor 2.

Next, the second current control will be described with reference to FIG. 6. The second current control is control for causing the SR motor 2 to temporarily output the torque that is higher than the allowable range. In other words, the second current control is control for generating the torque in the rotational direction to start the vehicle 1 by temporarily supplying the current value that is larger than the normal maximum current value Imax0 to the SR motor 2. FIG. 6 shows second maximum torque Tmax2 in addition to the normal maximum torque Tmax0. In the case where the vehicle 1 cannot be started even when the SR motor 2 outputs the normal maximum torque Tmax0, the ECU 4 temporarily changes the maximum current value to a value that is larger than the normal maximum current value Imax0. In the following description, the maximum current value that is allowed to flow through the SR motor 2 in the second current control is simply referred to as a second maximum current value Imax2. The second maximum torque Tmax2 indicates the maximum torque that can be output by the SR motor 2 when the second maximum current value Imax2 is energized.

The second maximum current value Imax2 is calculated on the basis of a state of the battery 20, such as a temperature or a voltage of the battery 20, and a state of the SR motor 2, such as a temperature of the coil 25, for example. The second maximum current value Imax2 is preferably defined within such a range that the second maximum current value Imax2 does not influence the durability of the SR motor 2 even when being temporarily supplied to the SR motor 2. In FIG. 6, a magnitude T3 of the second maximum torque Tmax2 that corresponds to the stop position ω1 is larger than the start requested torque. That is, the current at a larger current value than a normally allowed value is supplied to the SR motor 2. Accordingly, the motor torque is increased, and the vehicle 1 can thereby be started.

The control by the vehicular control apparatus 100 of this embodiment will be described with reference to FIG. 7. A control flow shown in FIG. 7 is executed in the case where the ECU 4 is actuated, for example, in the case where a travel range is instructed by the driver. This control flow is repeatedly executed at specified intervals, for example.

In step S10, the ECU 4 determines whether the vehicle 1 is stopped on the basis of the detection result of the vehicle speed sensor 9 or the like. If a positive determination is made that the vehicle 1 is stopped as a result of a determination in step S10 (step S10—YES), the process proceeds to step S20. If a negative determination is made (step S10—NO), the process proceeds to step S40.

In step S20, the ECU 4 derives the start requested torque. The start requested torque of this embodiment is the output torque (required torque) of the SR motor 2 that can start the vehicle 1. The vehicle 1 of this embodiment travels by using the SR motor 2 as the only one drive source. Accordingly, the start requested torque is the motor torque that is required to start the vehicle 1 in the travel direction against travel resistance such as gradient resistance. The ECU 4 calculates the start requested torque on the basis of a vehicle weight of the vehicle 1, the number of occupants of the vehicle 1, and a detected magnitude of the road surface gradient, for example. It should be noted that a value that is predetermined on the basis of the road surface gradient may be used as the start requested torque. After step S20 is executed, the process proceeds to step S30.

In step S30, the ECU 4 determines whether the vehicle can be started by the normal control. The ECU 4 makes a negative determination in step S30 in the case where all of the following conditions are established. (1) The travel direction of the vehicle 1 is the uphill direction. (2) The requested motor torque with respect to the SR motor 2 is the start requested torque or higher. (3) The magnitude of the normal maximum torque Tmax0 that corresponds to the detected rotation position of the rotor 22 is smaller than the magnitude of the start requested torque.

The above conditions will be described. In the case where the condition (1) is not established, it is attempted that the vehicle 1 is started on a flat road or is started in a downhill direction. Thus, the vehicle 1 can be started by the normal control. In the case where the condition (2) is not established, the requested motor torque that corresponds to the acceleration operation of the driver is lower than the start requested torque. That is, it can be said that a magnitude of the torque required to start the vehicle 1 is not requested to the SR motor 2 and thus a travel start in the travel direction is not instructed. In the case where the condition (2) is established, the ECU 4 starts measuring a stop time by a timer. The stop time to be measured is an elapsed time that is elapsed while the rotor 22 of the SR motor 2 is stopped from a time point at which a start request or an acceleration request by the driver is detected. The measured stop time is referred in step S80, which will be described below.

Regarding the condition (3), the magnitude of the normal maximum torque Tmax0 that is allowed in the normal control is calculated by referring to the map in FIG. 4, for example. By referring to the map in FIG. 4, the ECU 4 estimates the magnitude of the normal maximum torque Tmax0 of the SR motor 2 at the current rotation position of the rotor 22 that is detected by the position detecting section 3. In the case where the condition (3) is not established and the magnitude of the normal maximum torque Tmax0 at the current rotation position is the magnitude of the start requested torque or larger, the vehicle 1 can be started by the normal control.

The ECU 4 makes a positive determination in step S30 in the case where at least any one of the above conditions (1) to (3) is not established. If the positive determination is made as a result of the determination in step S30 (step S30—YES), the process proceeds to step S40. If a negative determination is made (step S30—NO), the process proceeds to step S50.

In step S40, the ECU 4 executes the normal control. When the acceleration operation by the driver is detected, the ECU 4 instructs the SR motor 2 to output the requested motor torque. This control flow is terminated when step S40 is executed.

In step S50, the ECU 4 determines whether the second current control can be executed. On the basis of the state of the battery 20 and the state of the SR motor 2, the ECU 4 determines whether a magnitude of the motor torque that exceeds the allowable range can be output from the SR motor 2. If a positive determination is made in step S50 (step S50—YES), the process proceeds to step S60. If a negative determination is made (step S50—NO), the process proceeds to step S80.

In step S60, the ECU 4 determines whether the vehicle can be started by the second current control. On the basis of the current state of the SR motor 2 and the current state of the battery 20, the ECU 4 determines the maximum current value (the second maximum current value Imax2) that is supplied to the SR motor 2 in the second current control. The ECU 4 estimates the second maximum torque Tmax2 that is output by the SR motor 2 at the current stop position of the rotor 22 in the case where the second maximum current value Imax2 is supplied. If a magnitude of the second maximum torque Tmax2 is the magnitude of the start requested torque or larger, a positive determination is made (step S60—YES), and the process proceeds to step S70. If a negative determination is made (step S60—NO), the process proceeds to step S80.

In step S70, the ECU 4 executes the second current control. The ECU 4 determines the requested torque with respect to the SR motor 2 to be within a range that is the second maximum torque Tmax2 or lower. A magnitude of the requested torque with respect to the SR motor 2 is preferably defined in a range from the start requested torque to the requested motor torque. However, until the rotor 22 starts rotating in the positive rotational direction, the magnitude of the requested torque with respect to the SR motor 2 may be increased to be larger than a magnitude of the requested motor torque. This control flow is terminated when step S70 is executed. It should be noted that, in the case where the requested motor torque corresponds to a value of the normal maximum torque Tmax0 or lower after step S70 is executed and the vehicle 1 is thus started, the ECU 4 terminates the second current control and starts the normal control.

In step S80, the ECU 4 determines whether the rotor 22 is stopped for a threshold time or longer. If the stop time (a continued stop time) of the rotor 22 from a time point at which the start request by the driver is detected is a predetermined threshold or longer, the ECU 4 makes a positive determination in step S80 (step S80—YES), and the process proceeds to step S130. If a negative determination is made in step S80 (step S80—NO), the process proceeds to step S90.

In step S90, the ECU 4 executes the non-energization control of the first current control. The ECU 4 prohibits a supply of the current to the coil 25 of the SR motor 2 and brings a state where excitation of the SR motor 2 is stopped. The SR motor 2, the excitation of which is stopped, does not generate torque in any rotational direction and thus is brought into a free state. In the case where the vehicle 1 is on an inclined road, a force in the downhill direction by the gravitational force acts on the vehicle 1. This force in the downhill direction is transmitted from a road surface to the SR motor 2 via the vehicle wheels 5. A direction of the torque that is input to the rotor 22 of the SR motor 2 is the reverse direction of the rotational direction in which the vehicle 1 is started, in other words, the reverse direction (the reverse rotational direction) of a direction of the torque requested by the driver. The rotor 22 rotates in the reverse rotational direction by the torque in the reverse rotational direction that is transmitted from the road surface. In this way, the rotation position of the rotor 22 is changed, and the magnitude of the normal maximum torque Tmax0 that can be output by the SR motor 2 is changed in accordance with a change in the rotation position. After step S90 is executed, the process proceeds to step S100.

In step S100, the ECU 4 determines whether the rotor 22 is stopped on the basis of the detection result of the position detecting section 3. The ECU 4 obtains the rotation position of the rotor 22 from the position detecting section 3 every time step S100 is executed, for example. The ECU 4 makes a positive determination in step S100 if a magnitude of a difference between the rotation position of the rotor 22 that was obtained last time and the rotation position of the rotor 22 that is obtained this time is a specified value or smaller. If it is determined in step S100 that the rotor 22 is stopped (step S100—YES), the process proceeds to step S110. If a negative determination is made (step S100—NO), the process proceeds to step S120.

In step S110, the ECU 4 continues counting the stop time by the timer. After step S110 is executed, the process moves to step S20.

In step S120, the ECU 4 resets the stop time of the rotor 22. The stop time is set to 0 because the rotor 22 starts rotating. After step S120 is executed, the process moves to step S20.

In step S130, of the first current control, the ECU 4 executes reverse torque output. In the case where the rotor 22 is stopped for the threshold time or longer (step S80—YES) regardless of a fact that the non-energization control (step S90) has been executed, it is considered as a situation where the rotor 22 does not rotate reversely only by the gravitational force. As such a situation, for example, a situation where the vehicle 1 is stopped in a state where the vehicle wheel is stuck in a dent on the road surface can be raised. In step S130, the ECU 4 causes the SR motor 2 to generate the torque in the reverse rotational direction and thereby causes the rotor 22 to rotate in the reverse rotational direction. A magnitude of the reverse torque that is generated by the SR motor 2 is preferably small in such a degree that the driver and the like of the vehicle 1 do not feel uncomfortable. When the reverse rotation of the rotor 22 is attempted on the uphill road, the torque in the reverse rotational direction by the gravitational force has already acted on the rotor 22. Accordingly, even when the magnitude of the reverse torque that is generated by the SR motor 2 is small, there is a high possibility that the reverse rotation of the rotor 22 can be started. The magnitude of the reverse torque that is generated by the SR motor 2 is preferably smaller than the magnitude of the reverse torque that acts on the rotor 22 in response to the gravitational force, for example. In addition, the magnitude of the reverse torque that is generated by the SR motor 2 may be set to a magnitude of a specified ratio with respect to the magnitude of the reverse torque by the gravitational force. As one example, the specified ratio may be a few [%]. After step S130 is executed, the process proceeds to step S20.

In the case where step S30 is executed after the first current control (steps S90, S130) is started, the rotation position of the rotor 22 is obtained again from the position detecting section 3 in step S30. The ECU 4 calculates the magnitude of the normal maximum torque Tmax0 that corresponds to the newly obtained rotation position. The ECU 4 determines whether the above conditions (1) and (2) are established, and on the basis of the latest magnitude of the normal maximum torque Tmax0, determines whether the above condition (3) is established. If the latest magnitude of the normal maximum torque Tmax0 is the magnitude of the start requested torque or larger, the condition (3) is not established, and thus the positive determination is made in step S30. As a result, in the case where the first current control has been executed so far, the first current control is terminated in step S40, and the normal control is resumed. That is, the ECU 4 terminates the current control (the first current control) for causing the reverse rotation of the rotor 22, starts the normal current control with respect to the SR motor 2, and thereby starts the vehicle 1 by the motor torque.

As it has been described so far, in the case where the start of the vehicle 1 is attempted but the vehicle 1 is not started (step S30—NO) even when the SR motor 2 outputs the normal maximum torque Tmax0 (the maximum torque that can be output by the normal current control), the ECU 4 (the control section) of the vehicular control apparatus 100 of this embodiment executes the first current control for causing the rotor 22 to rotate in the reverse direction from the rotational direction in which the vehicle 1 is started (steps S90, S130).

If it is determined that the vehicle can be started by the normal control during the execution of the first current control (step S30—YES), the ECU 4 terminates the first current control in step S40 and starts the normal control. That is, the ECU 4 terminates the current control (the first current control) for causing the reverse rotation of the rotor 22 and controls the SR motor 2 such that the vehicle 1 generates the drive power in a start direction that is requested by the driver. That is, after the rotor 22 rotates in the reverse direction by the first current control to the rotation position at which the torque for enabling the start of the vehicle 1 can be output, the ECU 4 executes the current control (the normal control) for causing the rotor 22 to rotate in the rotational direction (the positive rotational direction) to start the vehicle 1.

Just as described, the vehicular control apparatus 100 of this embodiment can improve the start performance of the vehicle 1 by causing the reverse rotation of the rotor 22 by the first current control to the rotation position at which the start requested torque can be output.

Here, "the rotation position at which the torque for enabling the start of the vehicle 1 can be output" is preferably a rotation position at which the normal maximum torque Tmax0 becomes the start requested torque or higher. However, instead of this, the rotation position at which the second maximum torque Tmax2 becomes the start requested torque or higher may be adopted. That is, the first current control may be control for causing the reverse rotation of the rotor 22 by the second current control to the rotation position at which the vehicle 1 can be started.

The ECU 4 preferably determines a target rotation position of the rotor 22 such that a change amount of the rotation position of the rotor 22 by the first current control is the smallest. For example, in the case where the vehicle becomes able to be started by either the normal control or the second current control while the rotor 22 rotates reversely by the first current control, it is preferred that the first current control is terminated at that time point and the vehicle 1 is started. The ECU 4 may determine a target value of a reverse rotation amount of the rotor 22 in advance. For example, it is assumed that a reverse rotation amount of the rotor 22 that is required to enable the start by the second current control is assumed to be smaller than a reverse rotation amount of the rotor 22 that is required to enable the start by the normal control. In this case, the first current control is preferably executed with the smallest reverse rotation amount that enables the start of the second current control as the target value of the reverse rotation amount of the rotor 22.

The ECU 4 of this embodiment can execute the second current control for causing the SR motor 2 to temporarily output the torque that is in the rotational direction to start the vehicle 1 (the positive rotational direction) and that is higher than the maximum torque that can be output by the normal current control. In the case where the vehicle 1 is not started by the normal maximum torque Tmax0 of the SR motor 2 (the maximum torque that can be output by the normal current control) (step S30—NO), the ECU 4 prioritizes the execution of the second current control over that of the first current control. In this embodiment, the control flow is configured that the second current control is executed first in the case where the second current control can be executed (step S50—YES) and the vehicle can be started by the second current control (step S60—YES). In the case where the second current control cannot be executed, or in the case where the vehicle 1 cannot be started by the second current control, the first current control is executed. By prioritizing the execution of the second current control over that of the first current control, the ECU 4 increases start responsiveness and thereby improves the start performance of the vehicle 1.

By stopping the excitation of the SR motor 2 in the first current control (step S90), the ECU 4 of this embodiment causes the rotor 22 to rotate in the reverse rotational direction by the gravitational force that acts on the vehicle 1. In the situation where the vehicle 1 cannot be started by the motor torque, such as during the uphill traveling, the torque in the reverse rotational direction caused by the gravitational force acts on the rotor 22. In this situation, the rotor 22 can rotate reversely by stopping the excitation of the SR motor 2. Accordingly, the rotor 22 can rotate reversely while electric power consumption by the SR motor 2 is suppressed. Therefore, both of the improvement in the start performance of the vehicle 1 and a reduction in fuel consumption can be achieved.

In the case where the rotor 22 does not rotate in the reverse rotational direction (step S80—YES) even after the excitation of the SR motor 2 is stopped for a specified period in the first current control, the ECU 4 of this embodiment causes the SR motor 2 to output the torque in the reverse rotational direction (step S130) and causes the rotor 22 to rotate in the reverse rotational direction. Because the reverse rotation of the rotor 22 is promoted by motor torque, the ECU 4 adjusts the rotation position of the rotor 22 by the motor torque, and thereby improves the start performance of the vehicle 1.

In the case where the vehicle 1 is not started (step S30—NO) by the normal maximum torque Tmax0 of the SR motor 2 (the maximum torque that can be output by the normal current control) and the start direction of the vehicle 1 is the uphill direction, the ECU 4 of this embodiment may cause the SR motor 2 to output the torque in the reverse rotational direction and thereby cause the rotor 22 to rotate in the reverse rotational direction in the first current control. In the case where the negative determination is made in step S50 or step S60 and thus the first current control is executed, the ECU 4 may execute the reverse torque output control (step S130) without executing torque lowering control (step S90). When the vehicle is started in the uphill direction, the force in the downhill direction by the gravitational force acts on the vehicle 1. Accordingly, it is considered that the driver is less likely to feel uncomfortable even when the SR motor 2 outputs the reverse torque. The ECU 4 improves the start responsiveness by causing the reverse rotation of the rotor 22 by the reverse torque output control.

The vehicular control apparatus 100 according to this embodiment can increase a maximum value of the gradient on which the vehicle can be started and thus can improve the start performance of the vehicle 1. In addition, by determining in advance whether the vehicle can be started by the normal control and thereby executing the first current control or the second current control, the vehicular control apparatus 100 according to this embodiment can suppress the wasteful excitation that causes the SR motor 2 to continuously output the power in a state where the motor torque is short with respect to the start requested torque. In this way, the improvement in the start responsiveness, the improvement in the fuel consumption, protection against a temperature increase of the SR motor 2, and the like become possible.

Figure 8:
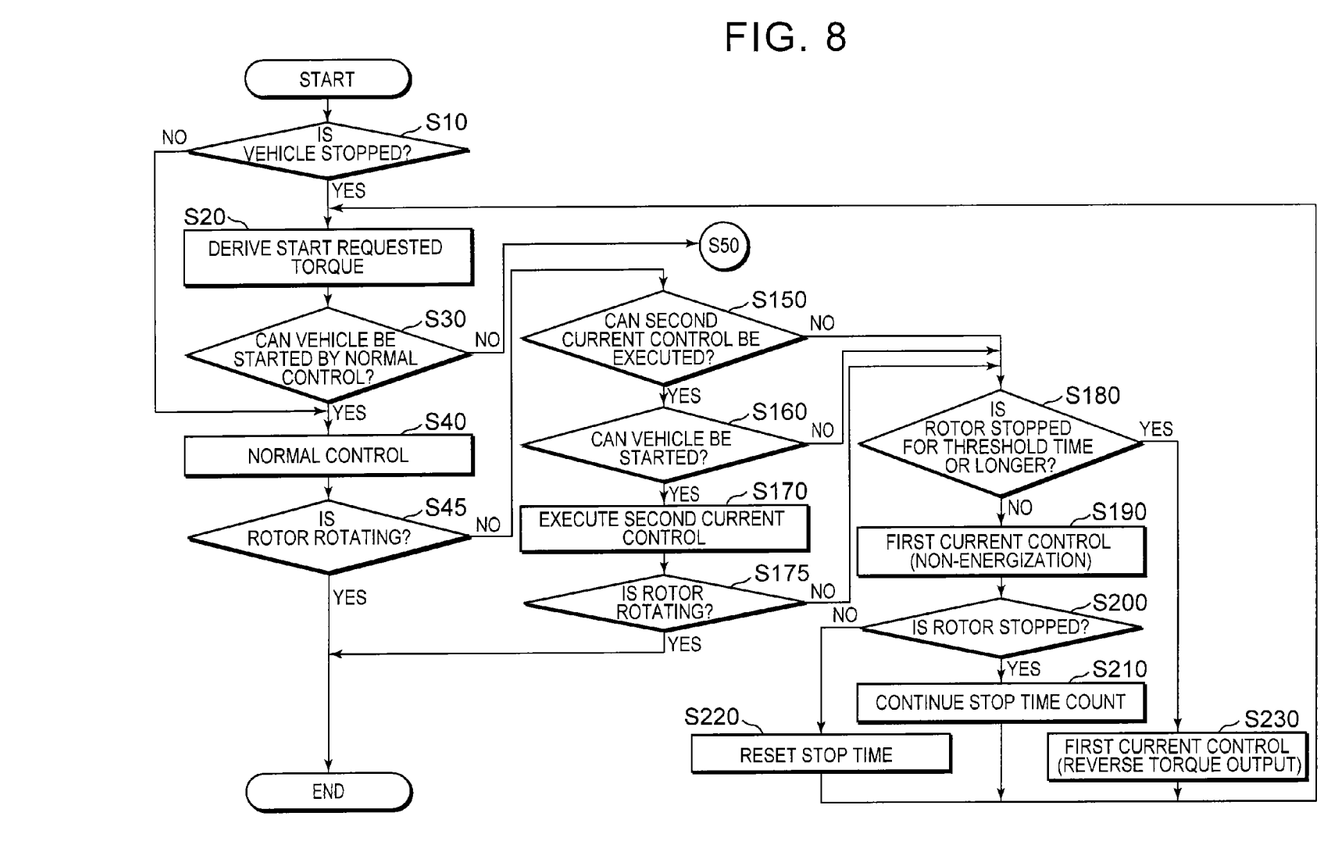
FIG. 8 is a flowchart of an operation according to a second embodiment.

A second embodiment will be described with reference to FIG. 8. Regarding the second embodiment, components that have similar functions as those described in the above first embodiment are denoted by the same reference numerals, and an overlapping description will not be made. FIG. 8 is a flowchart of an operation according to the second embodiment. A point in the second embodiment that differs from the above first embodiment is a point that not only the control for predicting whether the vehicle 1 can be started and executing the start (the normal control, the first current control, the second current control) is selected, but also the control for determining whether the rotor 22 has actually rotated as a result of executing the each control and executing the start is selected again.

For example, when the vehicle rides on a step during the start, higher torque than the start requested torque that corresponds to the road surface gradient is possibly required to start the vehicle 1. In such a case, even when it is determined that the vehicle can be started by the normal control on the basis of the road surface gradient and the normal control is started, there is a case where the travel resistance is in fact too high to start the rotation of the SR motor 2. In this embodiment, as a result of the execution of the normal control and the second current control, it is determined whether the rotor 22 has actually rotated. In the case where the rotor 22 does not rotate by the normal control, torque increase by the second current control or the reverse rotation of the rotor 22 by the first current control is executed. In addition, in the case where the rotor 22 does not rotate by the second current control, the reverse rotation of the rotor 22 by the first current control is executed. Thus, according to the start control of this embodiment, in a situation where the travel resistance is high, such as the case where the vehicle rides on the step during the start, the appropriate control can be selected, and the start performance of the vehicle 1 can thereby be improved.

The control of the second embodiment will be described with reference to FIG. 8. A point in the control flow shown in FIG. 8 that differs from the control of the first embodiment (FIG. 7) is a point that step S45, step S75, and step S150 to step S230 are added.

In the flowchart in FIG. 8, step S10 to step S40 are the same as step S10 to step S40 of the above first embodiment. If the negative determination is made in step S30, the same process as the process from step S50 to step S130 in the flowchart of the above first embodiment shown in FIG. 7 is executed. In the second embodiment, after step S40 is executed, the process proceeds to step S45. In step S45, the ECU 4 determines whether the rotor 22 is rotating on the basis of the detection result of the position detecting section 3. If a positive determination is made in step S45 (step S45—YES), the process is terminated. If a negative determination is made (step S45—NO), the process proceeds to step S150.

Step S150 in FIG. 8 is the same as step S50 in the above first embodiment. In step S160, the ECU 4 determines whether the vehicle can be started by the second current control. In step S160, the ECU 4 determines whether the currently requested motor torque can be output by the second current control. In the case where the magnitude of the requested motor torque that corresponds to the accelerator operation amount exceeds the magnitude of the second maximum torque Tmax2, it is considered that the vehicle 1 cannot be started by the second current control. In the case where the magnitude of the requested motor torque is the magnitude of the second maximum torque Tmax2 or smaller, the ECU 4 makes a positive determination in step S160 (step S160—YES), and the process proceeds to step S170. In the case where the magnitude of the requested motor torque exceeds the magnitude of the second maximum torque Tmax2, a negative determination is made in step S160 (step S160—NO), and the process proceeds to step S180.

In step S170 in FIG. 8, the ECU 4 executes the second current control. The magnitude of the requested torque with respect to the SR motor 2 in the second current control in step S170 is preferably the same as the magnitude of the requested motor torque that corresponds to the acceleration operation by the driver. In the second embodiment, after step S170 is executed, the process proceeds to step S175. In step S175, the ECU 4 determines whether the rotor 22 is rotating on the basis of the detection result of the position detecting section 3. If a positive determination is made in step S175 (step S175—YES), this control flow is terminated. If a negative determination is made (step S175—NO), the process proceeds to step S180. In FIG. 8, step S180 to step S230 are the same as step S80 to step S130 of the above first embodiment. That is, if a positive determination is made that the rotor 22 is stopped for the threshold time or longer (step S180—YES), the reverse torque output control (step S230) is executed. If a negative determination is made in step S180 (step S180—NO), the non-energization control is executed in step S190. If a positive determination is made that the rotor 22 is stopped (step S200—YES), the process proceeds to step S210, and counting of the stop time is continued. If a negative determination is made in step S200 (step S200—NO), the process proceeds to step S220, and the stop time is reset.

Figure 9:
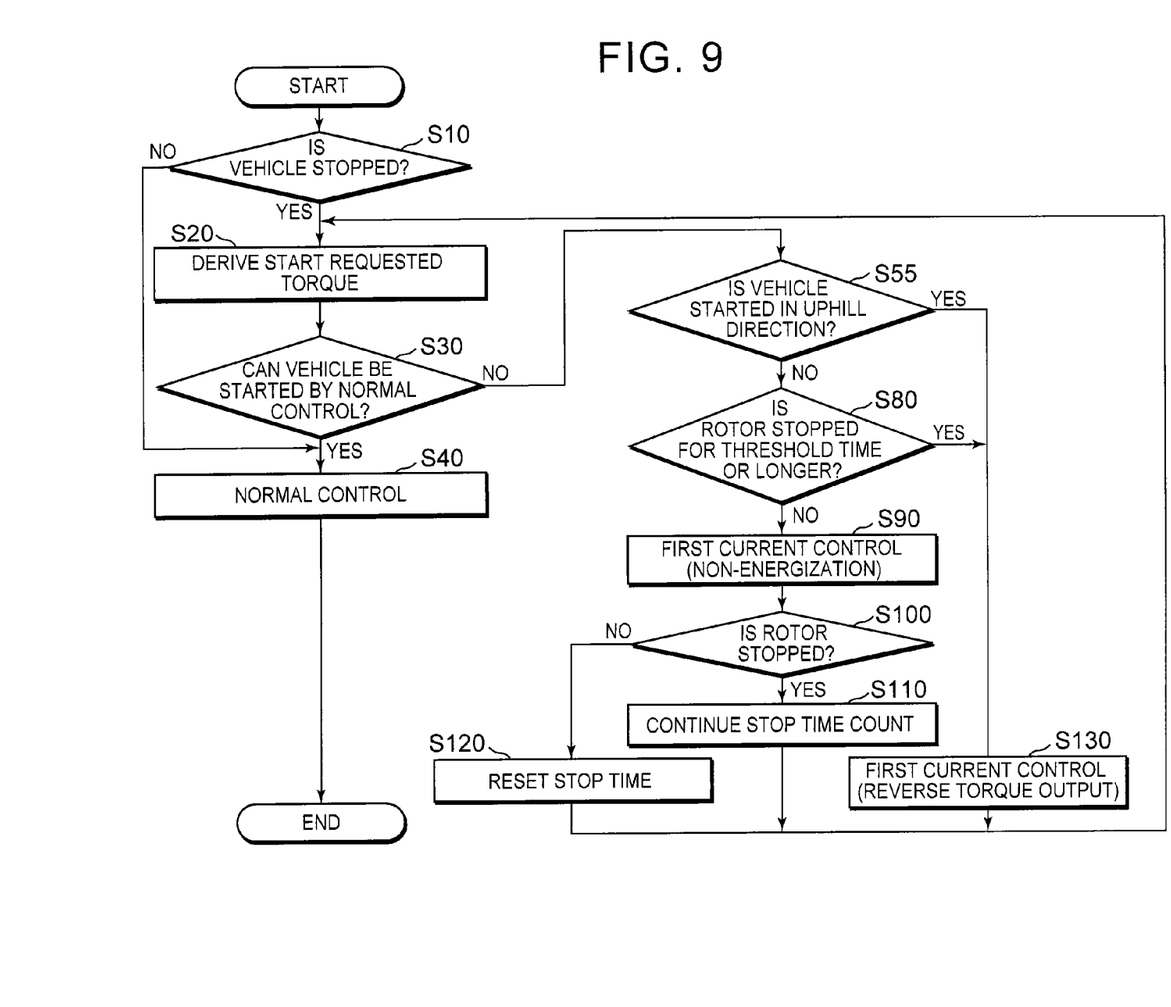
FIG. 9 is a flowchart of an operation according to a third embodiment.

A third embodiment will be described with reference to FIG. 9. Regarding the third embodiment, components that have similar functions as those described in the above first embodiment and second embodiment are denoted by the same reference numerals, and the overlapping description will not be made. FIG. 9 is a flowchart of an operation according to the third embodiment. If it is determined that the vehicle cannot be started by the normal control (step S30—NO), the ECU 4 of the third embodiment executes the first current control without executing the second current control. Furthermore, in the case where the vehicle 1 is started in the uphill direction, the ECU 4 executes the reverse torque output control in step S130 without executing the torque lowering control of step S80 in the flowchart of the first embodiment shown in FIG. 7.

As shown in FIG. 9, in the flowchart of this embodiment, steps according to the second current control (for example, step S50 to step S70 in FIG. 7) are not provided. In the flowchart in FIG. 9, step S10 to step S40 are the same as step S10 to step S40 of the above first embodiment. If the negative determination is made in step S30, the process proceeds to step S55, and whether the vehicle is started in the uphill direction is determined by the ECU 4. If the ECU 4 makes a positive determination that the vehicle 1 is started in the uphill direction on the basis of the detection result of the gradient sensor 10 (step S55—YES), the process proceeds to step S130. If a negative determination is made (step S55—NO), the process proceeds to step S80. It should be noted that, in the case where the start of the vehicle 1 in the uphill direction is attempted and a magnitude of the road surface gradient is a specified value or larger, the ECU 4 may make the positive determination in step S55. In the flowchart in FIG. 9, step S80 to step S130 are the same as step S80 to step S130 of the above first embodiment.

As it has been described so far, in the case where the vehicle 1 is not started by the normal maximum torque Tmax0 (the maximum torque that can be output by the normal current control) and the start direction of the vehicle 1 is the uphill direction (step S55—YES), the ECU 4 of this embodiment causes the SR motor 2 to output the torque in the reverse rotational direction and causes the rotor 22 to rotate in the reverse rotational direction in the first current control (step S130). Accordingly, the responsiveness from a time point at which the start request by the driver is made to a time point at which the vehicle 1 is actually started can be improved.

A first modified example of the above embodiments will be described. In the above first embodiment to third embodiment, orders of priority of the two types of the control of the first current control and the second current control are not limited to exemplified orders. For example, the execution of the first current control may be prioritized over that of the second current control, or the execution of the reverse torque output control may be prioritized over that of the torque lowering control in the first current control.

Figure 10:
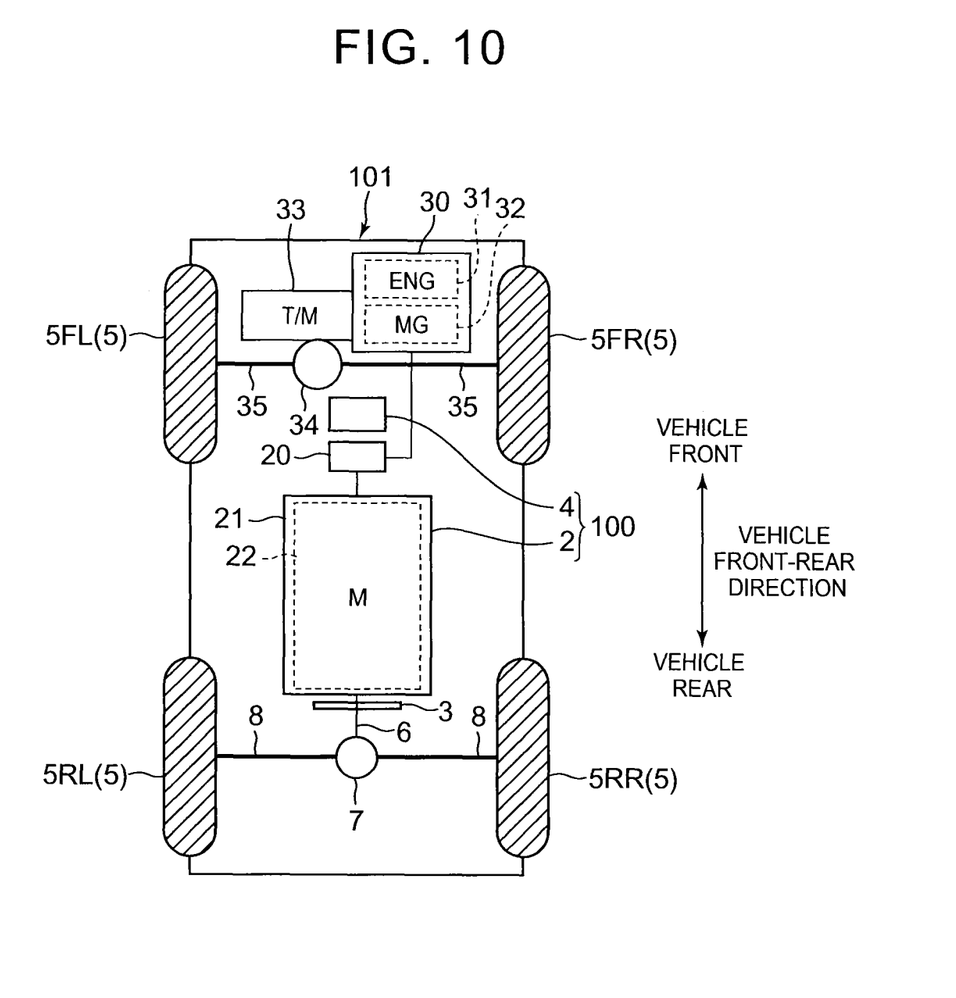
FIG. 10 is a schematic configuration diagram of a vehicle according to a second modified example of the embodiments.

Next, a second modified example of the above embodiments will be described. In the above first embodiment to third embodiment, the vehicle as an application target is not limited to the exemplified vehicle. FIG. 10 is a schematic configuration view of a vehicle according to the second modified example of the each embodiment. A point in a vehicle 101 according to the second modified example that differs from the vehicle 1 in each of the above embodiments is a point that a front-wheel drive source 30 is provided. The front-wheel drive source 30 has an engine 31 and a motor generator 32. For example, the engine 31 and the motor generator 32 may be connected in series, or may be connected in such a manner that power can be split via a differential mechanism such as a planetary gear unit. An output shaft of the front-wheel drive source 30 is connected to a differential gear set 34 via a transmission 33. The differential gear set 34 is connected to the front wheels 5FL, 5FR via left and right drive shafts 35, respectively. The transmission 33 controls a speed change ratio from the front-wheel drive source 30 to the front wheels 5FL, 5FR. The engine 31, the motor generator 32, and the transmission 33 are controlled by the ECU 4.

The ECU 4 determines output torque of the front-wheel drive source 30 and the output torque of the SR motor 2 on the basis of the requested drive power that is calculated from the accelerator operation amount and the like. Accordingly, in this modified example, of torque for generating the requested drive power, the torque generated by the SR motor 2 becomes the requested motor torque.

In the vehicle 101 of this modified example, the ECU 4 determines whether the vehicle can be started by the normal control as will be described below, for example. A description will be made with the above first embodiment (see FIG. 7) as an example. In step S30, similar to the above first embodiment, the ECU 4 calculates the start requested torque. The ECU 4 calculates the normal maximum torque Tmax0 of the SR motor 2 that corresponds to maximum torque Tmax30 of the front-wheel drive source 30 within the allowable range and the detected rotation position of the rotor 22. Here, the maximum torque Tmax30 corresponds to a value that is converted into torque on the drive shaft 35. In step S30 of the above first embodiment, the ECU 4 uses the following condition (4) instead of the condition (3). (4) A magnitude of total vehicle wheel torque in the case where the front-wheel drive source 30 outputs the maximum torque Tmax30 and the SR motor 2 outputs the normal maximum torque Tmax0 is smaller than the magnitude of the start requested torque. The ECU 4 makes a negative determination in step S30 in the case where all of the conditions (1), (2), and (4) are established.

In step S60, in the case where the SR motor 2 outputs the second maximum torque Tmax2 and thus the total vehicle wheel torque becomes the start requested torque or higher, the ECU 4 can determine that the vehicle can be started by the second current control (step S60—YES).

As it has been described so far, in the vehicle 101 in which the drive source is mounted in addition to the SR motor 2, in the case where the vehicle 1 cannot be started even when the each drive source outputs the maximum torque within the allowable range, the first current control and the second current control are executed.

What have been disclosed in each of the above embodiments and each of the above modified examples can appropriately be combined and implemented.

What is claimed is:

1. A vehicular control apparatus, comprising:
a switched reluctance motor having a rotor and a stator and mounted as a travel drive source in a vehicle;
an electronic control unit configured to execute current control of the switched reluctance motor, the electronic control unit being configured to:
   (i) execute first current control, the first current control causing the rotor to rotate in a reverse direction from a rotational direction in which the vehicle is started, in a case where the vehicle is not started even when the switched reluctance motor outputs a maximum torque that can be output by a normal current control;
   (ii) execute control for causing the rotor to rotate in the rotational direction in which the vehicle is started after the rotor rotates in the reverse direction by the first current control to a rotation position at which torque for enabling a start of the vehicle can be output; and
   (iii) prioritize execution of second current control over execution of the first current control in the case where the vehicle is not started even when the switched reluctance motor outputs the maximum torque that can be output by the normal current control, the second current control causing the switched reluctance motor to temporarily output torque that is in the rotational direction for starting the vehicle and is higher than the maximum torque that can be output by the normal current control.

2. The vehicular control apparatus according to claim 1, wherein, in the first current control, the electronic control unit is configured to:
   (i) stop excitation of the switched reluctance motor, and
   (ii) cause the rotor to rotate in the reverse direction by a gravitational force that acts on the vehicle.

3. The vehicular control apparatus according to claim 2, wherein, in the first current control, the electronic control unit is configured to:
   in a case where the rotor does not rotate in the reverse direction even after the excitation of the switched reluctance motor is stopped for a specified period,
      (i) cause the switched reluctance motor to output torque in the reverse direction, and
      (ii) cause the rotor to rotate in the reverse direction.

4. The vehicular control apparatus according to claim 1, wherein, in the first current control, the electronic control unit is configured to:
   in the case where the vehicle is not started even when the switched reluctance motor outputs the maximum torque that can be output by the normal current control and a start direction of the vehicle is an uphill direction,
      (i) cause the switched reluctance motor to output torque in the reverse direction, and
      (ii) cause the rotor to rotate in the reverse direction.

* * * * *